May 16, 1950  R. A. KAISER ET AL  2,507,600
DUAL AIRCRAFT CONTROL ASSEMBLY
Filed Sept. 17, 1947  2 Sheets-Sheet 1
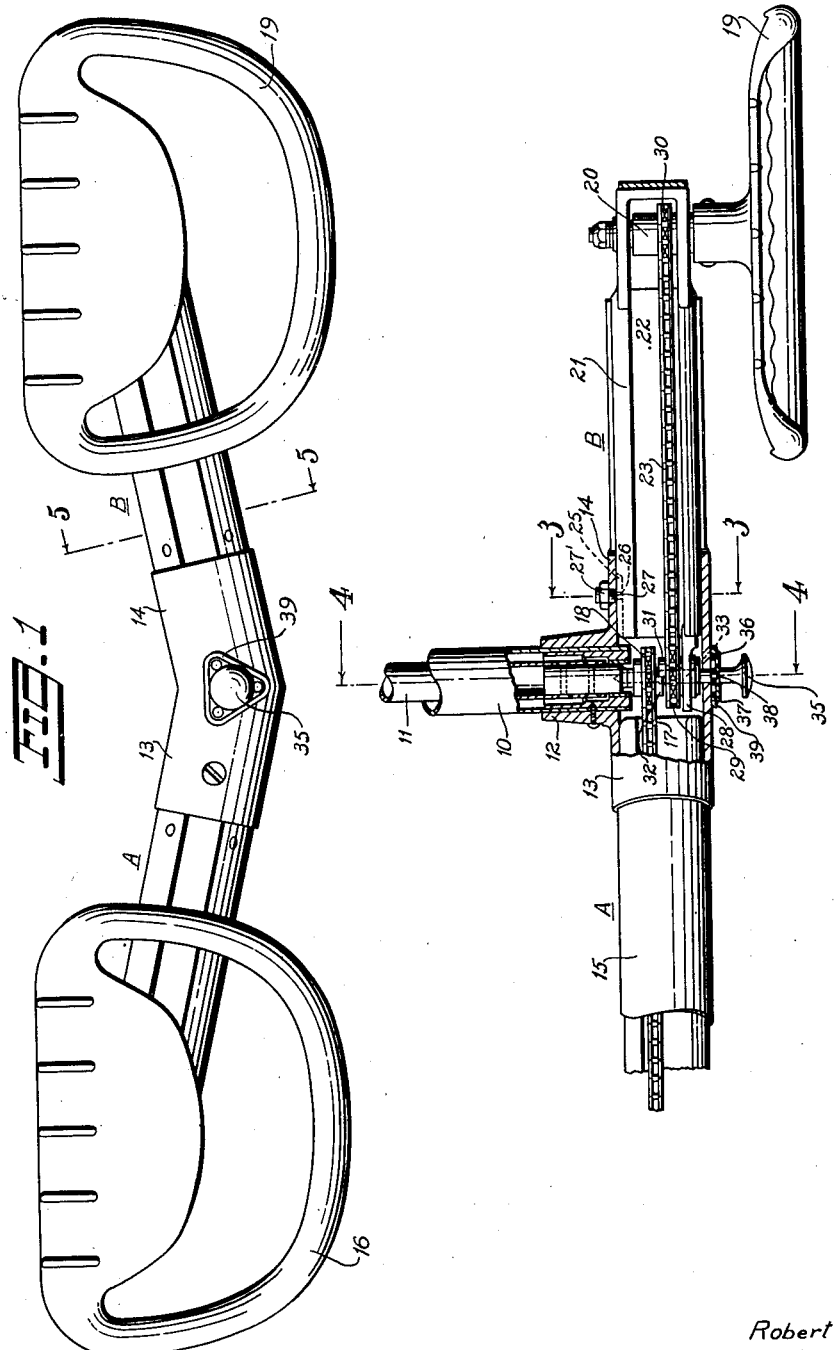
INVENTORS.
Robert Q. Kaiser
BY and Thomas W. Kerr.
Charles S. Wilson
ATTORNEY.

May 16, 1950 R. A. KAISER ET AL 2,507,600
DUAL AIRCRAFT CONTROL ASSEMBLY
Filed Sept. 17, 1947 2 Sheets-Sheet 2
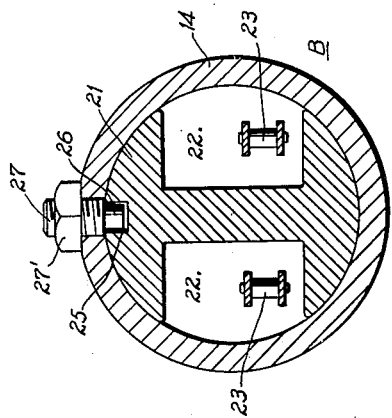
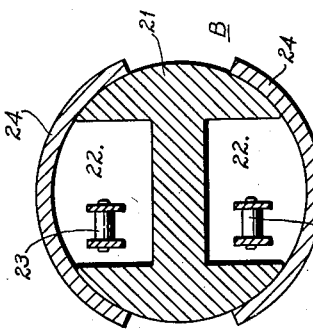
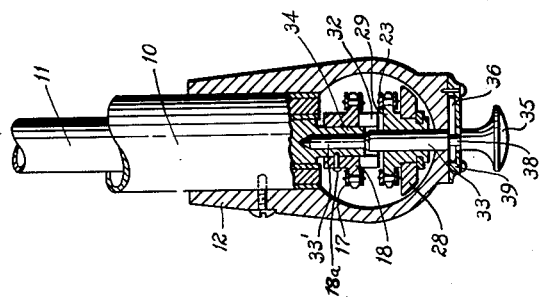
INVENTORS.
Robert Q. Kaiser
BY and Thomas W. Kerr.
Charles S. Wilson
ATTORNEY.

Patented May 16, 1950

2,507,600

UNITED STATES PATENT OFFICE 2,507,600

DUAL AIRCRAFT CONTROL ASSEMBLY

Robert A. Kaiser, Flushing Heights, and Thomas W. Kerr, Lindenhurst, N. Y., assignors to Republic Aviation Corporation, near Farmingdale, N. Y., a corporation of Delaware Application September 17, 1947, Serial No. 774,576

17 Claims. (Cl. 74—494)

This invention relates to dual aircraft controls embodying at least two control units whereby either of two pilots may navigate and control the operation of the aircraft and proposes means whereby one of the dual control units may be rendered ineffective or be removed from its normal operative position to the end that the operation of the aircraft may be confined or restricted to the remaining or companion control unit.

Among the objects attained by the present invention in providing for the ready removal or replacement of one of the units of a dual control assembly is access to structure and equipment normally obstructed by the unit, the use of any door or opening aligned with the removable unit, as for example a door located in the nose of the fuselage, and the elimination and prevention of participation in or interference with the control and navigation of the aircraft by a copilot or by any passenger able to reach the removable control unit when in its operative or normal position.

With the above and other objects in view, as will be apparent, this invention consists in the construction, combination, and arrangement of parts, all as hereinafter more fully described, claimed and illustrated in the accompanying drawing wherein:

Fig. 1 is a front elevation of a dual control assembly embodying the present invention showing both units of the control in their operative or functioning positions;

Fig. 2 is a fragmentary to the plane view thereof with parts of the control column and of the removable control unit shown in longitudinal section;

Fig. 3 is a transverse section taken through the removable unit along line 3—3 of Fig. 2 near the root end thereof;

Fig. 4 is a section taken along line 4—4 of Fig. 2 to illustrate coaction of the dual control units with the components of the control column; and Fig. 5 is a transverse section taken through the removable control unit along line 5—5 of Fig. 1.

Where dual control is desired in the operation of an aircraft both the pilot and the copilot should have access to the control assembly in order that either may operate or navigate the airplane, but on occasion it is desirable to eliminate the control normally available to the copilot. For example, this may occur when the occupant of the copilot's seat is merely a passenger and not a pilot, or when, for any reason the possibility of interference with or participation in the operation of the aircraft by anyone other than the actual pilot is objectionable. In any event one of the control units is at all times necessarily idle and may become a menace to the safe navigation or operation of the airplane. Usually in airplanes having a dual control of this type, the control assembly is situated directly across and in front of the instrument panel and associated structure, so that if a nose door is provided in the fuselage one of the units of the control assembly extends across and obstructs such door.

The present invention therefore proposes a dual control assembly by which the aircraft can be operated by either pilot or copilot in the conventional manner, but which has incorporated therein means whereby at least one of the control units may be entirely removed from its normal or operative position without interfering with the use and operation of the companion or remaining control unit. This removal of one of the control units establishes unobstructed access to the instrument panel and associated structure, clears any door in the fuselage normally in alignment with the removable unit and provides means whereby any occupants of the plane, other than the pilot, will be prevented from interfering with or participating in, the operation or control of the aircraft.

Heretofore in dual aircraft controls, two control units, relatively fixed, are permanently mounted in the aircraft, or a single control unit is mounted to swing from a position before the pilot's seat to a position before the copilot's seat or vice versa. The first of these controls is open to many obvious objections while the second has the disadvantage of requiring a mounting to allow this swinging movement, complicates the association of the control assembly with the control column and does not permit simultaneous, dual operation which is so desirable in primary flight instruction. A dual control assembly following the teachings of the present invention makes possible simultaneous, dual operation during flight instruction and at the same time allows the complete removal of one of the control units when that is desired, all of which is accomplished by a relatively simple, light weight mechanism.

Reference being had more particularly to the drawings, 10 designates the control column of an aircraft, the reciprocation of which operates the elevator and 11 denotes the torque shaft concentrically and rotatably mounted within the column for the operation of the ailerons. A collar 12 embraces and is fixed to the extremity of the column 10 and carries the approximately opposed control units A and B as will be hereinafter described. Either of the dual control units A and B may be employed to reciprocate the control column 10 and thereby operate the elevator, or to rotate the torque shaft 11 and thereby adjust the ailerons.

The collar 12 is provided with hollow bushings 13 and 14 on opposite sides thereof which respectively serve to mount the control units A and B. The bushing 13 is to mount the permanent control unit A consisting of an arm 15 fixedly mounted in the bushing 13 and terminating at its outer extremity in a mounting for the control wheel or element 16. This control wheel 16, mounted for rotation relative to the arm 15, is directly and permanently connected to the outer extremity of the torque shaft 11 by a continuous sprocket chain 17 operating over the sprockets 18, one of which is keyed or otherwise secured to the axis of the control wheel 15 while the other is keyed or otherwise secured, as at 18a to the concentric stud 34 projecting from the outer extremity of the torque shaft 11. The sprocket chain 17, together with the outer sprocket 18, operates and is housed within the hollow arm 15, the inner sprocket 18 being concentric to the axis of the shaft 11 within the control space defined by the collar 12 in conjunction with the bushings 13 and 14. Since the inner end of the arm 15 is fixed within the bushing 13 in any suitable manner it, in effect, becomes a permanent part of the control assembly and while it can be removed for repair no temporary removal or replacement thereof is contemplated. Thus the control unit A may be considered a permanent unit of the dual control assembly as distinguished from the removable unit B.

The companion or opposed unit B is removably mounted in the bushing 14. This unit consists of a control wheel or element 19 similar in all respects to the control wheel 16 and mounted on a spindle 20 journaled at the outer end of a bar 21. As shown in Figs. 3 and 5, where the bar 21 is disclosed in transverse section, while it is initially of circular section the formation of two diametrically opposed longitudinal channels 22 therein converts it into an I-section. These channels 22 are for the reception of the bights of the continuous sprocket chain 23 in travelling between the spindle 20 of the control wheel 19 and the torque shaft 11, as will be described. Sections 24 of a casing or shell embrace the bar 21 to act as closures for the channels 22 thereby completely housing and enclosing the chain 23.

The inner extremity of the bar 21 is received within the bushing 14 where it is removably secured by a lug 26 carried at and projecting from the inner end of a screw 27 threaded through the bushing 14 to be received in a relatively short shallow groove 25 formed longitudinally of the end portion of the bar. A lock nut 27' is provided on the screw 27 to prevent accidental retrograde movement thereof.

At its inner end the bar 21 is provided with a longitudinally projecting bracket or integral plate 28 as a mounting for the sprocket 29 supported for rotation thereon. This sprocket 29 is aligned longitudinally of the bar 21 with the sprocket 30 fixed to the spindle or axle 20 of the control wheel 19 whereby the continuous sprocket chain 23 operating in the opposed channels 22 of the bar 21 may readily pass over and engage the sprockets 29 and 30. Thus as the wheel 19 rotates it drives and rotates the sprocket 29 at the inner end of the unit through the sprocket 30 and the sprocket chain 23.

When the removable control unit B, consisting of the wheel 19 and the aforesaid element associated with and driven by it, is in its operative position the inner sprocket 29 is axially aligned with the sprocket 18 fixed to the stud 34 at the outer end of the aileron torque shaft 11. To transmit the movement of the sprocket 29 to the shaft the inner face of the sprocket 29 is provided with a fixed, substantially semicircular, projecting lug or extension 31, the outer edge of which is curved concentrically to the common axis of the sprocket 29, sprocket 18 and shaft 11 while its inner edge is straight and lies approximately on a diameter of sprocket 29. A similarly formed opposite and complemental lug or extension 32 is so fixed to the outer face of the sprocket 18 on the stud 34 of the shaft 11 to combine with lug 31 to form a driving connection or clutch between the sprockets 18 and 29. Hence when the removable unit B is in its operative position, as shown in Figs. 1 and 2, the straight edges of the lugs 31 and 32 abut. Accordingly the rotation of either of the control wheels 16 and 19 not only rotates the shaft 11 but also equally rotates the opposed or companion wheel.

To hold the removable unit B in its operative position and yet permit its removal a concentric mounting pin 33 is provided. This pin 33 is projected through, or withdrawn from, registered axial openings in the hubs of the sprockets 18 and 29 and its inner end portion 33' (Figs. 1 and 4) is received in a concentric passage in the projecting stud 34 situated at the end of the shaft 11 when the pin 33 is situated in its operative position. For its manipulation the outer end of the mounting pin 33 is provided with a hand hold 35 by which the pin may be withdrawn from engagement in the passage of the projecting stud 34 and the openings in the hubs of the sprockets 18 and 29. To retain the pin 33 against accidental displacement a pair of semi-circular snap rings 36 are disposed upon each side of the common axis of sprockets 18 and 29, in a depression 37 axially aligned with shaft 11 at the junction of bushings 13 and 14 and spring into and engage a circumferential depression 38 in the pin 33 adjoining the hand-hold 35 when the pin is fully received in the openings and passage aforesaid. A cover plate 39, perforated for the passage of the pin 33 closes the depression 37 and retains the rings 36 therein.

Since the sprocket 18 is fixed to the stud 34, which in turn is a part of or fixed to the shaft 11, the permanent unit A is always connected to the shaft 11 for the rotation thereof. Also when the removable unit B is in its operative position, as shown in Figs. 1 and 2, and the mounting pin 33 is in position, that unit becomes an operative element of the whole control assembly with the sprocket 29 thereof operatively connected to the sprocket 18 by the cooperation of opposed complemental lugs or extensions 31—32. However, the removal of the mounting pin 33 from its operative position and the removal of the lug 26 from the slot 25 of the bar 21 by the retrograde removement of the screw 27, permits the unit B to be disengaged from the assembly and the inner end of the bar 21 of the unit to be withdrawn from the bushing 14. In that event the entire unit B including the inner sprocket 29 is withdrawn and separated from the composite dual control assembly. This removal of the unit B does not affect the operation and functioning of the permanent unit A, thus the removal of the unit B in effect converts the control assembly from a dual control into a single control. Manifestly the removable unit B may be returned to its operative position and may be there fixed by the insertion or projection of the lug 26 into the slot or groove 25 and the reinsertion of the pin 33 into the openings in the hubs of the sprockets 18 and 29 and the passage of the stud 24 of the shaft 11.

From the foregoing it is obvious that removal of the unit B from the control assembly eliminates any possibility of interference with or participation in the operation or navigation of the aircraft by a copilot or passenger and leaves the control thereof entirely dependent on the manipulation of the permanent unit A. To that extent the present invention is a safety feature. Moreover, the removal of the unit B permits ready and unobstructed access, not only to any door that may be in the nose of the fuselage or otherwise in alignment with or obstructed by the unit B in its normal or operative position, but also allows access to any equipment, apparatus or structure which likewise may be obstructed by unit B.

The advantages of the present invention over a single control unit which may be swung or pivoted about the control column from one position to another are obvious. For primary training or instruction complete dual control is possible with the advantage of conversion into single control when that is desired.

What is claimed is:

1. The combination with an aircraft control column including a rotary component, of a dual control assembly associated with said column consisting of a pair of control units each of which embodies a rotary control element and driving means operating between the rotary control element and a point aligned with the axis of the rotary component of said column, a direct connection between the driving means of one unit and said rotary component, a disengageable clutch interposed between the driving means of both units whereby the operation of the control element of either unit adjusts the rotary component aforesaid and simultaneously rotates the companion control element, and means whereby said clutch may disengage and one of said units may be removed from its operative position independently of and without affecting the operation of the remaining unit.

2. The combination with an aircraft control column including a rotary shaft, of a pair of control units associated with the control column, each having a rotary control wheel at one end, a driven member at the opposite end, and means for operating the driven member from and by said control wheel, disengageable clutch means interposed between the driven members of the control units whereby the rotation of one driven member rotates the other, and means for operatively connecting one of said driven members to said shaft.

3. The combination with an aircraft control column including a rotary shaft, of a dual control assembly associated with said column comprising a pair of control units, a rotary control wheel at the outer extremity of each unit, a rotary driven member at the inner extremity of each control unit, the driven member of one of said units being permanently fixed to the shaft of the control column aforesaid and the driven member of the other unit being separably associated with the driven member of the first unit, independent means connecting the control wheel of each unit to its corresponding driven member, and a clutch to disengageably interconnect said driven members when operatively associated whereby the rotation of the control wheel of either unit rotates the control wheel and driven member of the companion unit as well as the rotary shaft of the column.

4. The combination with an aircraft control column including a rotary shaft, of a dual control assembly associated with said column comprising a pair of control units, a rotary control wheel at the outer extremity of each unit, a rotary driven member at the inner extremity of each control unit, the driven member of one of said units being permanently fixed to the shaft of the control column and the driven member of the other unit being separably associated with the driven member of the first unit, independent means connecting the control wheel of each unit to its corresponding driven member, a clutch element on each driven member to coact with a similar and complemental clutch element on the other driven member to establish a disengageable driving interconnection between said driven members, and means whereby the control unit having its driven member separable as aforesaid may be removed from the control assembly.

5. The combination with an aircraft control column including a rotary shaft, of a dual control assembly associated with said column comprising a pair of control units, a rotary control wheel at the outer extremity of each unit, a driven member at the inner extremity of each unit, the driven member of one of said units being fixed to the shaft aforesaid, means whereby each control wheel rotates its corresponding driven member, a separable clutch device interposed between the aforesaid driven members whereby the rotation of either driven member rotates the other driven member and said shaft, and means whereby the control unit connected to the shaft solely by and through said clutch device may be removed from the assembly.

6. In a dual aircraft control the combination with a control column, of two control units associated with said column, each unit embodying a control member and a driving connection for an adjustment of the control column by said member, means common to both control units and the control column to separably interconnect the driving connections of the several control units and to establish operative relationship thereof with said control column, and means whereby one of said units may be disassociated from the control column to restrict control to the remaining unit.

7. In a dual aircraft control the combination with a control column including a rotary shaft, of a control assembly associated with said column comprising a pair of control units, a rotary control wheel at the outer extremity of each unit, a driven member at the inner extremity of each unit concentric to the axis of the rotary shaft, the driven member of one unit being fixed to said shaft, a driving connection between the wheel of each unit and the driven member of that unit, a separable clutch member interposed between the driven members of the several units, and means whereby one of said units may be disassociated from the control assembly to confine control of the aircraft to the unit having its driven member fixed to said shaft.

8. The combination with an aircraft control column embodying a rotary shaft, of a pair of control units associated with said column, each unit including a rotary control wheel at one of its ends, a driven member at the opposite end thereof, and means for operating the driven member from and by the control wheel, means for independently mounting said units in association with said column with the driven members thereof concentric to and rotatable on the axis of said shaft, a permanent connection between one of said driven members and said shaft, and a disengageable clutch interposed between the latter driven member and the driven member of the other unit.

9. The combination with an aircraft control column embodying a rotary shaft, of a pair of control units associated with said column, each unit including a rotary control wheel at one of its ends, a driven member at its opposite end, and means for operating the driven member from and by the control wheel, means for independently mounting said units in association with said column with the driven members thereof concentric to and arranged to rotate about the axis of said shaft, a permanent connection between one of said driven members and said shaft, clutch elements on adjacent faces of the driven members to cooperate one with the other and establish a separable connection between said members, and means whereby one of said control units may be removed from its association with the column and its cooperation with the other control unit.

10. The combination with an aircraft control column including a rotary shaft, of a dual control assembly associated with said control column comprising a pair of control units, each unit consisting of a bar, a rotary control wheel at the outer end of said bar, a driven member at the inner end of said bar, and means operatively connecting said control wheel with said driven member, means for independently mounting said units on the control column with the driven members thereof adjacent and parallel one to the other and concentric to the axis of the shaft of the column, a permanent connection between one of said driven members and said shaft, and a disengageable clutch operable between the adjoining faces of said driven members whereby the operation of either control wheel rotates both driven members and the shaft and one of the control units may be removed from its mounting on the control column.

11. The combination with an aircraft control column including a rotary shaft, of a dual control assembly associated with said control column comprising a pair of control units, each unit consisting of a bar, a rotary control wheel at the outer end of said bar, a driven member at the inner end of said bar, and means operatively connecting said control wheel with said driven member, means for independently mounting said units on the control column with the driven members thereof adjacent and parallel one to the other and concentric to and rotatable about the axis of said shaft, a permanent connection between one of said driven members and the shaft, a clutch element on that face of the driven member permanently attached to the shaft adjoining the companion driven member, and a similar and complemental clutch element on that face of the other driven member adjoining the first clutch element whereby the cooperation of said clutch members operatively connects said driven members one to the other and to the shaft.

12. The combination with an aircraft control column including a rotary shaft, of a control assembly associated with said control column comprising a pair of control units, each unit consisting of a bar, a rotary control wheel at the outer end of said bar, a driven member at the inner end of said bar, and means operatively connecting said control wheel with said driven member, means for independently mounting said units on the control column with the driven members thereof parallel and adjacent one to the other and concentric to and rotatable about the axis of said shaft, a permanent connection between one of said driven members and the shaft, complemental clutch elements on the adjoining faces of the driven members whereby the cooperation of said clutch elements operatively and separably connects said driven members one to the other and to the shaft, and means for dismounting one of said control units from its operative position on the control column without affecting the operativeness of the remaining unit.

13. A control unit comprising a bar having open, opposed channels extending longitudinally thereof, a rotary control wheel at one end of said bar, a sprocket fixedly associated with said wheel, a second sprocket mounted for rotation at the opposite end of said bar in alignment with the first sprocket, and a continuous sprocket chain operating over both sprockets and in said channels.

14. The combination with an aircraft control column enclosing a shaft, of a collar affixed to the extremity of said column, a pair of generally opposed bushings carried by said collar, a primary control unit permanently mounted in one of said bushings, a secondary control unit removably mounted in the other of said bushings, and separable means for interconnecting said units thereby connecting the secondary unit to said shaft.

15. The combination with an aircraft control column enclosing a rotary shaft, of a collar fixed to the extremity of said column, a pair of generally opposed bushings carried by said collar, a primary control unit mounted in one of said bushings and permanently connected to said shaft, a secondary control unit removably mounted in the other of said bushings, a separable connection between the primary and the secondary control units thereby operatively associating the secondary unit with said shaft, and means for retaining the secondary unit operatively mounted in its associated bushing and releasable to permit the removal of the secondary unit from the assembly thereby restricting and limiting the control of the aircraft to the primary unit.

16. The combination with an aircraft control column enclosing a rotary shaft, of a collar fixed to the extremity of said column, a pair of generally opposed bushings carried by said collar, a primary control unit mounted in one of said bushings consisting of a control wheel, a driven member, and a driving means connecting said wheel and driven member for mutual operation, a permanent connection between the driven member of the primary unit and said shaft, a secondary control unit, structurally duplicating the primary unit, removably mounted in the other of said bushings with its driven member closely associated with the driven member of the primary unit, separable clutch elements interposed between the driven members to interconnect them for mutual operation, and a removable pin projecting concentrically through the driven members and into the extremity of the shaft to hold the clutch elements in their cooperative positions and the secondary control element against removal from its bushing.

17. A control unit comprising a bar having open, opposed channels extending longitudinally thereof, a rotary control wheel at one end of said bar, a sprocket fixedly associated with said wheel, a second sprocket mounted for rotation at the opposite end of said bar in alignment with said first sprocket, a continuous sprocket chain operating over both sprockets and in said channels, and a shell associated with said bar having sections thereof acting as closures for said channels.

ROBERT A. KAISER.
THOMAS W. KERR.

REFERENCES CITED

The following references are of record in the file of this patent:

UNITED STATES PATENTS

| Number | Name | Date |
|---|---|---|
| 1,571,413 | James | Feb. 2, 1926 |

FOREIGN PATENTS

| Number | Country | Date |
|---|---|---|
| 16,137 | Great Britain | July 12, 1911 |
| 130,431 | Great Britain | Aug. 7, 1919 |
| 838,732 | France | Dec. 16, 1938 |